Figure 1:
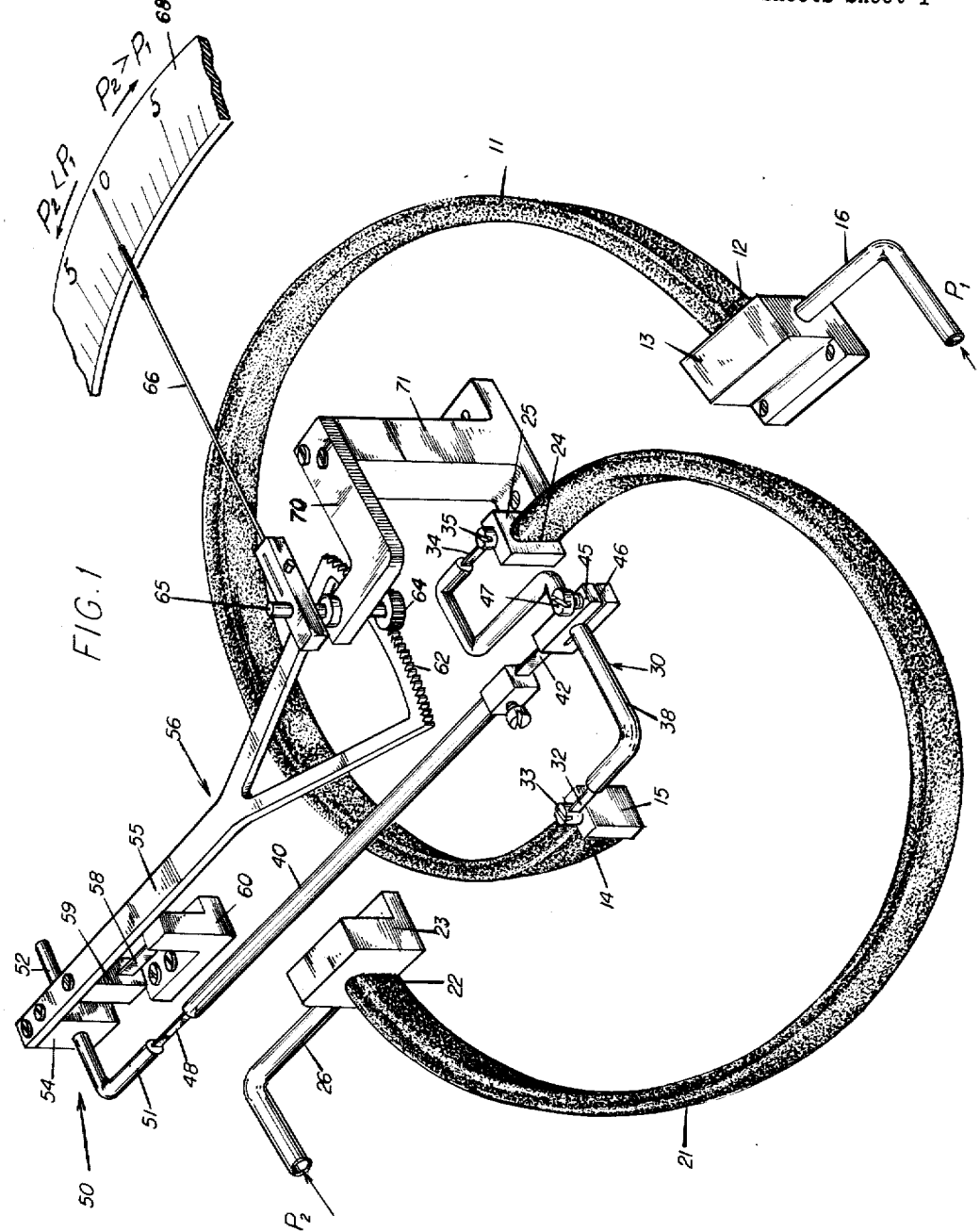

July 2, 1963

J. O. KIRWAN 3,095,745

DIFFERENTIAL PRESSURE INSTRUMENT

Filed May 28, 1959

2 Sheets-Sheet 1

INVENTOR.
John O. Kirwan
BY
Robert S. Dunham
Attorney

July 2, 1963

J. O. KIRWAN 3,095,745

DIFFERENTIAL PRESSURE INSTRUMENT

Filed May 28, 1959

2 Sheets-Sheet 2

INVENTOR.
John O. Kirwan
BY
Robert S. Dunham
Attorney

United States Patent Office 3,095,745
Patented July 2, 1963

3,095,745
DIFFERENTIAL PRESSURE INSTRUMENT
John O. Kirwan, Livingston, N.J., assignor to Wallace & Tiernan Incorporated, Belleville, N.J., a corporation of Delaware
Filed May 28, 1959, Ser. No. 816,619
9 Claims. (Cl. 73—412)

This invention relates to pressure instruments of the Bourdon tube type, and more particularly to instruments which are arranged to be governed by the difference between pressure responses of a pair of Bourdon tubes and which may therefore be described as differential pressure instruments.

In conventional Bourdon tube devices, the pressure-sensitive element consists of a sealed hollow metal tube of flattened cross-section communicating with a source of pressure to be measured, the tube being fixed at one end and being arranged to extend from such end along a curved path, with the other end of the tube free to move. As is well known, the degree of curvature of the tube along the path, and hence the position of the free end, depends upon the difference between the internal pressure and the pressure on the outer tube surface, the latter usually being atmospheric pressure. Thus an alteration of the pressure in the tube relative to the external pressure tends to cause a change in the flattened character of the cross-section and therefore to alter the curvature of the tube along its arcuate length, with consequent displacement of the free end. Thus with an increase of pressure supplied inside the tube, its lengthwise curvature is decreased, i.e. in the sense of having a greater radius of curvature, and vice versa. By appropriate linkage to the free end of the tube a pointer or other indicator is conventionally arranged to provide readings of pressure, e.g. gauge pressure, where the exterior of the tube is exposed to the atmosphere.

For certain purposes it has been found desirable to measure differences between pressures from two sources. While such measurement is theoretically obtainable by enclosing the tube in a sealed container and connecting the second source to the interior so that the opposite sides of the tube wall are respectively subjected to the source pressures, such arrangements are undesirable for many purposes, especially in the hazard of providing an instrument box or case which must resist relatively high pressures. Arrangements have also been proposed for connecting the ends of two Bourdon tubes to devices arranged for differential rocking action relative to a pointer shaft, but linkages heretofore proposed have fallen considerably short of providing a truly useful degree of accuracy, or of permitting even reasonably accurate differential readings over an extended scale.

Another use for differential reading connections of pressure-sensitive elements such as Bourdon tubes is in the measurement of absolute pressure values. Thus by connecting one Bourdon tube to a source of pressure to be determined and by maintaining the other Bourdon tube in an internally evacuated condition so as in effect to have a constant zero pressure within it, a differential reading of the positions of the free ends of the tubes will measure the absolute pressure of the source while compensating effectively for fluctuations in atmospheric pressure.

For the attainment of these results, it will now be appreciated that the two Bourdon tubes must have their free ends connected so that essentially only the difference of pressure response between them will cause deflection of a pointer or equivalent element thereby controlled. That is to say, the linkage or movement must be such as to displace the pointer in response to movements of either or both Bourdon tubes, while the mechanism must be truly differential to the extent that displacemets of both, caused by equal pressure changes in the same direction, have no effect on the pointer. Under such circumstances, the resulting reading is representative of pressure difference, or in the case of absolute pressure measurement, is free of deviation by changes in atmospheric pressure as subjected to the external surfaces of both tubes. The provision of an accurate device of this character is further complicated by the fact that it is usually impossible, within practical manufacturing tolerances, to construct Bourdon tubes so that the total movement of the end of the tube for a given pressure change is identical in all tubes manufactured; the movement is proportional to pressure variation, but the amount of movement tends to differ, at least slightly, from tube to tube.

It is accordingly an object of the present invention to provide improved apparatus which is capable of measuring a difference of pressures, i.e. a differential pressure instrument, that in a more effective and accurate way enables such measurement with a single indicating device or the like. A further object is to afford improved means for effectuating response to Bourdon tubes as the pressure-sensitive elements in instruments of the character described. Another object is the provision of improved devices, operating over a relatively wide range of values, for measuring the differential displacement of two Bourdon tubes, so as to determine the difference of pressures established in or communicated to such tubes.

A more specific object of the invention is to provide new and improved linkage or movement for an instrument embodying two Bourdon tubes whereby the latter are connected to displace a single indicating means or the like, the linkage being arranged to translate only the differential displacement of the tubes and to afford no response when both of the tubes experience identical pressure changes in the same direction. An additional object is to afford such linkage or instrument movement, which has effective accuracy over a wide range, for response to the pressure difference without being affected by common displacement of the tubes when there is an increase or decrease of pressure in both.

To these and other ends, the invention essentially comprises a pair of Bourdon tubes, each having free and fixed ends, and arranged so that the paths of movement of their free ends lie substantially along parallel lines, spaced apart to accommodate a yoke or lever as described below. Specifically, the improved linkage takes advantage of the fact that the free end of a Bourdon tube moves along a substantially straight line in response to pressure differences, i.e. the motion of the free end thus being approximately rectilinear through a distance which is proportional to the change in pressure between the interior and exterior of the tube. In the present invention, the tubes are oriented so that the line of movement of each is coplanar and parallel with the line of movement of the other, while the direction of movement of each (for example in response to increase of internal pressure) is opposite to the direction of movement of the other.

The improved apparatus thus comprises the two Bourdon tubes arranged as described above, with a yoke connecting the free ends of the tube, such yoke thus in effect lying along a transversal of the parallel lines. Connections of the yoke to the ends of the tubes are effected with flexures, i.e. stiff, resiliently flexible elements providing an essentially pivotal relation without bearing friction or wear. The yoke is connected to a push rod or like element, advantageously through a third flexure, with means for adjusting the position of the push rod connection along the yoke, i.e. toward one or the other of the ends of the Bourdon tubes. The push rod in turn is connected, through further flexure means, to displace appropriate actuating means, such as a sector gear and pinion, for a pointer or other indicating element. Specifically, the three flexures connecting the yoke respectively with the ends of the Bourdon tubes and the push rods, lie along a single straight line, which constitutes, in effect, the transverse line described above as defining the location of the yoke.

With this arrangement, and with the free ends of the Bourdon tubes moving in respectively opposite directions for like pressure changes, it will be seen that equal increases in pressure in the two tubes will simply rock the yoke about the flexure that connects it with the push rod, so that there is no displacement of the latter, and a similar effect prevails upon identical decreases in pressure in the tubes. If unequal pressure changes occur or if the change occurs in one tube and not in the other, the resultant displacement of the yoke is such as to shift the push rod and correspondingly move the indicating means, for measurement of the change in pressure difference between the tubes. Effective accommodation of the mechanism to the actual characteristics of the two tubes, i.e. to differences in the absolute amount of displacement of each with pressure change, is achieved by adjusting the position of the push rod flexure crosswise on the yoke. Thus the effects of displacements of the two ends can be properly balanced and equated to achieve identical movement of the push rod, as desired. Hence the complete linkage affords accurate, continuing response to pressure changes in the Bourdon tubes, and to yield a reading only of pressure difference, with good accuracy over a relatively wide range.

Figure 2:
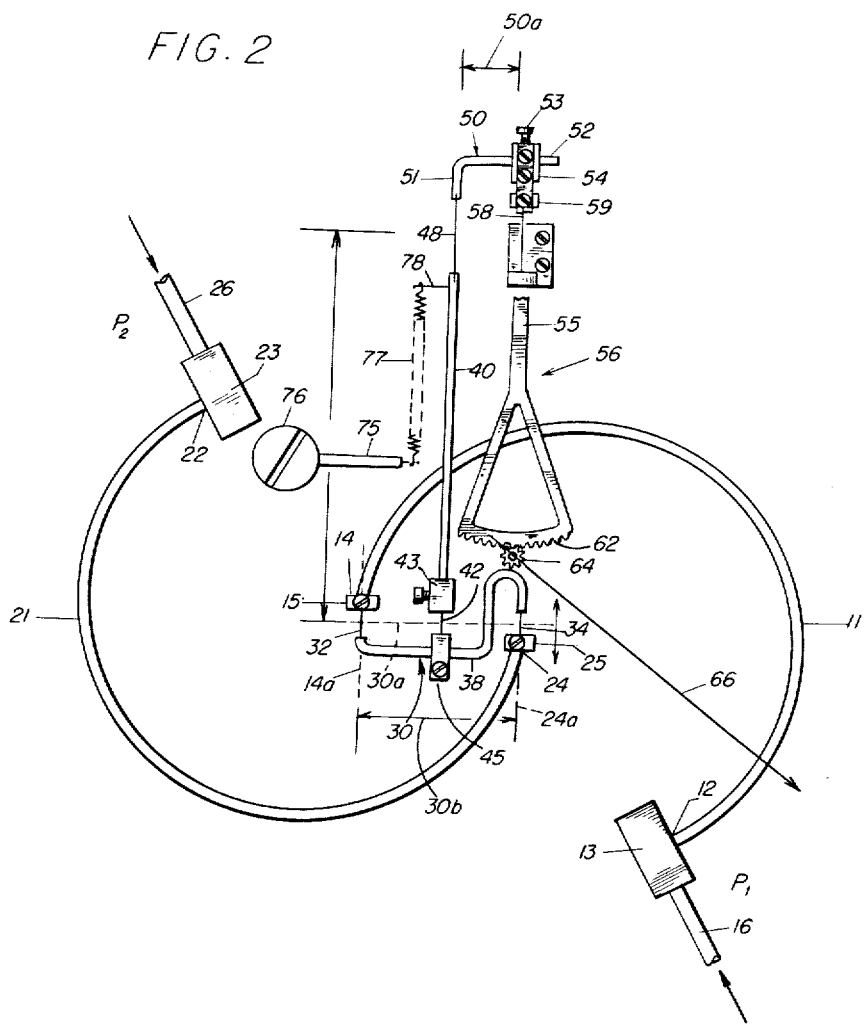

Further details of the construction and operation of the invention will appear from the description of an illustrative example hereinbelow, together with the accompanying drawings wherein:

FIG. 1 is a perspective view of one embodiment of the invention, somewhat simplified for purposes of illustration, and FIG. 2 is a schematic plan view or diagram of the apparatus of FIG. 1 (with some addition), to show certain preferred geometrical relationships.

It will be understood that the device is shown in simplified form for clarity, omitting various structural and mechanical details that would be conventional in instruments of this sort, such as the case or housing, the complete structure of a dial or scale, safety stops for preventing damage to the Bourdon tubes or other parts on overload, anti-backlash means for gearing, counter means as where the pointer can make more than one scale revolution, and the base plate and various mounting or supporting structures or features additional or supplemental to the elements shown.

In its illustrated embodiment, the invention will be described as designed for measuring the difference of two pressures $P_1$, $P_2$, it being understood that one of these pressures may be fixed, e.g. as in effect zero pressure where one of the tubes is evacuated and sealed so that the instrument will read the absolute value of pressure communicated to the other tube. Referring to the drawings, the device includes a first Bourdon tube 11, receiving pressure $P_1$, and comprising a hollow metal member of flattened cross-section fixed at one end 12 in a mounting block 13 and extending from the latter along a monoplanar curved path to an outer, freely movable end 14 sealed by the closure block 15. At its fixed end the tube communicates with the source of pressure $P_1$ by a suitable conduit or tubing 16 and an appropriate internal passage (not shown) in the block 13, the latter being secured to an appropriate base plate (also not shown) or like structure. Since the tube 11 is sealed except for communication through the conduit 16, its internal pressure is that of the source $P_1$, and its external pressure is that of the surrounding atmosphere.

As indicated, the tube 11 is curved through a substantial arc, e.g. selected in the range of 240° to 250°, or more generally in the range of 180° to 270°. It will be understood that although tubes of the illustrated configuration are particularly suitable for the invention, elements of greater or less curvature, or embodying other modification, as known in the art of Bourdon tubes, may be employed when particular requirements demand. The tube 11 responds to increases or decreases of its internal pressure $P_1$, relative to the external pressure, by corresponding, substantially proportional displacements of its free end 14. Thus as seen in FIG. 2, a change of pressure difference between the inside and outside of the tube 11 in the direction in which the inside pressure becomes higher relative to the pressure outside, acts to reduce the curvature of the arcuate figure of the tube, i.e. to uncurl it, displacing its free end 14 upwardly, while a reverse change of such pressure difference between the interior and exterior, viz. in the direction of a lower pressure inside relative to the outside, causes the tube 11 to curl more closely (increasing its curvature), so that the free end 14 moves downwardly. It will be understood, of course, that these changes are related to a tendency of pressure variations to alter the cross-sectional shape of the tube, the latter being flatter with decreased internal pressures and more rounded as such pressure rises.

The illustrated device also includes a second Bourdon tube 21 which may be essentially identical in shape, dimensions and character with the tube 11, and disposed so that its arcuate configuration lies in the same plane as the tube 11. The tube 21 has its fixed end 22 secured in a mounting block 23 and its freely movable end 24 sealed by a closure block 25. Communication with a source of pressure $P_2$ to admit such pressure to the interior of the tube 21 is effected through a conduit 26 and an internal passage (not shown) in the mounting block 23. The free end 24 of the tube 21 thus moves in a path like that of the end 14 of the tube 11, with changes of the internal pressure $P_2$ in the tube 21. The paths of movement of the ends 14, 24 of the two tubes are respectively along straight lines, in the planes of the arcuate tubes and thus in the same plane with each other, in the illustrated device. As will be seen particularly in FIG. 2, the two tubes 11, 21 are so disposed, by their mounting blocks 13, 23, that the straight-line paths of movement 14a, 24a are parallel and rather considerably spaced. Each tube is reversely disposed relative to the other in the common plane so that the directions of displacement of the free ends 14, 24 are opposite for a pressure change of a given sense. Thus upon increase in pressure in both tubes, as seen in FIG. 2, the free end 14 moves upwardly and the free end 24 moves downwardly, and vice versa, for decreases of pressure.

A yoke element 30, composed of rigid rod, extends between and is pivotally connected to the free ends 14, 24 of the two Bourdon tubes 11, 21. Specifically, at one end, the yoke 30 is pivotally connected to the end 14 of the tube 11 by a spring metal flexure 32 which is secured in a post or stud 33 on the sealing block 15. As will be readily understood, the flexure 32 is a small strip of stiff, resilient metal having its ends fixedly carried respectively in the post 33 and the adjacent end of the yoke 30, so that the yoke may swing relative to the block 15 without play or bearing friction. At its other end, the yoke is identically connected by a like flexure 34 to a similar post 35 on the sealing block 25 at the free end 24 of the tube 21. The disposition of the yoke and the connecting flexures is conveniently such that the flexures 32, 34 lie along the respective lines of movement 14a, 24a of the free ends 14, 24 of the tubes, and are positioned at the ends of a perpendicular line 30a to the parallel lines 14a, 24a when the pressures in the tubes have certain relationships.

To accommodate the described situation of the flexure pivots 32, 34, the bar of the yoke 30 is made in somewhat of an S-shape, as shown, to include a relatively long portion 38, extending considerably more than halfway from one of the lines of tube travel, such as the line 14a, toward the other line 24a. A push rod 40 is arranged for pivotal connection to a central locality of the yoke, as by means of a flexure 42, identical with the flexures 32 and 34. One end of the flexure 42 is secured in a member 43 which constitutes a socket rigidly receiving the end of the rod 40, while the other end of the flexure 42 is carried in a block 45 which is adjustably secured to the long transverse portion 38 of the yoke 30. Specifically, the block 45, horizontally drilled to receive the yoke 30, is split along a horizontal plane to the rod-receiving opening as at 46, with the outer portions of the split block clamped by a screw or the like 47. Thus the position of the block 45 along the portion 38 of the yoke 30 can be adjusted, and the block can then be secured or clamped in place, as by tightening the screw 47. The flexure 42 is disposed to be approximately parallel to the flexures 32 and 34, and to lie across the same transverse perpendicular line 30a which intersects the other flexures. More generally defined, the three flexures 32, 42 and 34 are all disposed to intersect a common transverse line, which thus in effect constitutes the line of connection provided by the yoke 30.

The push rod 40 extends a considerable distance rearwardly (upwardly in FIG. 2) from the region of the flexure 42, and at its remote end is connected by a further flexure 48 to one end of an L-shaped arm or link 50, i.e. a part 51 (of the arm 50) which is coaxial with the rod 40. Another part 52 of the arm 50, at right angles to the portion 51, is adjustably mounted, with a set screw 53 or the like, in a rigid element 54 at the remote end of the long arm 55 of a segment gear device generally designated 56.

The segment gear device 56 is pivotally connected and supported from the base plate or other structure (not shown) by a flexure 58 extending from suitable structure 59 on the gear arm 55 to a mounting block or post 60. Thus the segment gear device 56 is arranged to be rocked about the pivot constituted by the flexure 58, the device 56 being provided with gear teeth 62, i.e. a gear segment, along an arcuate surface having a radius extending from such surface to the pivot axis of the flexure 58.

The flexures 48 and 58 are advantageously arranged to be essentially parallel and directly opposite each other, spaced by the extent to which the part 51 of the arm 50 is remote from the block or element 54.

It will be understood that the segment gear 56, as well as its pivotal mounting 58 and indeed also its linked connection to a push rod such as the rod 40, constitute part of a known type of instrument movement, as for converting displacements of the rod into rocking motion of the gear segment 62. The displacements of the gear segment are translated into appropriate positioning of an indicating means, for example by turning a pinion gear 64 which is mounted on a vertical shaft 65 that also carries a pointer 66 or the like. Hence when the segment gear 56 is rocked about its pivot 58, the pointer 66 is swung about the axis of the shaft 65, so that readings may be taken on a suitable scale 68 over which the pointer travels.

The pointer shaft 65 is suitably journaled and supported, as with bearings appropriate for sensitive instruments, by a supporting structure, e.g. as indicated by the arm 70 on the fixed post 71. It will be understood that other linkages or arrangements of gearing or the like may be employed to translate displacements of the push rod 40 into movements of a suitable indicating means or equivalent device for reading, registering or otherwise utilizing the measured pressure changes. The illustrated arrangement, however, is particularly convenient, especially as including the flexure pivots 48, 58, for positive, sensitive and highly reproducible results.

Although the several flexure strips are illustrated as relatively thin, flat spring elements of appropriate metal, with their ends rigidly gripped by the associated connecting parts, they may be constructed in other appropriate ways, for example in that the flexure 48 can be constituted by a flattened region in a single bar or rod which comprises the rod 40 and the L-shaped member 50.

As has been indicated above, the complete instrument may include other parts and structures as appropriate for gauges or meters of this general type, and such further elements are omitted for simplicity of illustration. FIG. 2 shows, however, a zero-adjusting device consisting of an arm 75 carried by a screw or the like 76, which can be releasably secured in various positions of rotation. From the outer end of the arm 75 a coil spring 77 under tension extends to a pin or eye 78 on the push rod 40, e.g. at a locality near the flexure 48. Thus by adjusting the angular position of the arm 75, with corresponding change in the tension of the spring 77, the position of the push rod relative to the segment gear device 56 is changed, whereby the pointer or needle 66 can be set accurately at a desired zero point.

An essential feature of the function of the device is that the push rod 40 is only displaced, for moving the pointer 66, when there is a change of the internal pressure of one of the Bourdon tubes relative to that of the other. When pressures in both tubes change in the same direction and by the same amount, the yoke 30 is in effect simply rocked about the central flexure 42, causing no displacement of the rod 40, but if there is a change in the difference of pressures $P_1$ and $P_2$ (respectively occurring in the tubes 11, 21), the free end of one tube is displaced asymmetrically relative to the free end of the other tube and the position that has been occupied by the central flexure 42, so that the central flexure, and thus the end 43 of the push rod is moved, to cause a displacement of the indicating mechanism.

Although the two Bourdon tubes are constructed to be as nearly alike as possible, exact identity of quantitative displacement of their outer, free ends with pressure change is not commonly attained. Thus initial adjustment of the member 45, and hence of the position of the flexure 42, transversely of the yoke 30 must be made. Conveniently this operation is performed by alternately supplying identical low pressures and identical high pressures to the interiors of the tubes 11, 21. The clamping screw 47 is loosened, and the position of the block 45 is shifted, one way or the other along the yoke section 38, until the pointer 66 remains motionless, i.e. at the same position for both pressures. The screw 47 is then tightened, clamping the block 45 on the yoke, and thus setting the pivot flexure 42 at a point where the effects of the two Bourdon tubes acting to shift the push rod with like changes of pressure, are exactly equal and opposite. Thus the instrument is adjusted to compensate quite accurately for differences in absolute quantitative response of the Bourdon tubes. As explained above, the push rod 40 will then only be moved, in an essentially axial direction, when there is a change in the difference of pressures in the tubes. The effect of such difference is that the free end of one tube, i.e. at the flexure 32 or 34, moves the yoke 30 about the flexure at the end of the other tube as a fixed pivot point, and correspondingly displaces the rod. Axial movement of the rod causes the segment gear member 56 to swing about its pivot flexure 58, the arm 50 in effect representing a lever arm rigidly carried by the gear segment and pulled or pushed through the flexure 48 to effect the angular displacement of the segment.

The range of the instrument is adjusted by varying the distance between the flexures 48 and 58. This is accomplished by adjusting the position of the portion 52 of the arm structure 50 in the block 54, and thus in effect adjusting the length of the lever arm by which displacements of the push rod are caused to rock the segment gear. The distance which is thus adjusted is indicated at 50a in FIG. 2. For example, by setting this distance appropriately, the instrument can be accurately calibrated to a particular scale for the marked values of pressure difference when such in fact occur between the applied pressures $P_1$ and $P_2$.

Although it is apparent that the invention may be embodied in structures having a wide variety of dimensions and proportions, one example of an effective instrument included a pair of Bourdon tubes each lying in an arc (of about 250°) having a radius of about 1½ inches, the free ends of the tubes being disposed, and constrained by the common yoke 30, to move along lines 14a, 24a, 1¼ inches apart, these lines being substantially straight and parallel to each other over the displacements involved. The distance 30b (FIG. 2) was thus 1¼ inches. With a mechanical structure substantially as shown, including a segment gear and pinion of appropriate dimensions for operating the pointer 66, the described instrument had a push rod 40 of such length that the distance between the centers of the flexures 42 and 48 was 2¾ inches, while the distance 50a was adjustable over a range of, say 0.200 inch to 0.300 inch. Instruments of these and similar dimensions have been variously designed to accommodate maximum pressures (in each Bourdon tube) of various values from 30 p.s.i. to 500 p.s.i. (absolute).

In the examples of instruments just described, it has been found that such devices will indicate a differential pressure accurately to within 1/1000 of maximum pressure over a differential pressure range up to one-half of maximum. Thus where each Bourdon tube is designed for a maximum of 500 p.s.i., the gauge or instrument of the drawing will read differential pressures to within 0.5 p.s.i. over the differential pressure range from zero to 250 p.s.i. of differential pressure. The same instruments, indeed, are useful even to larger differential pressures, in the sense that where each Bourdon tube has a maximum of 500 p.s.i., differential pressures in the further range of 250 to 500 are found to be indicated with an accuracy of the order of about 1.0 p.s.i.

As has been explained, the arrangement of the yoke, and the setting of the clamp or head 45 thereon is such that the three flexures 32, 42 and 34 lie along a single straight line, perpendicular to the faces of the flexures. When there is an identical change in pressures in the two tubes this line of flexures simply rocks about the central flexure 42, without displacing the push rod at all. If the difference of pressures changes, however, the line 30a of the flexures then tends to swing about one or the other of the flexures 32, 34, shifting the rod and moving the pointer 66. Although for convenience of illustration the scale 68 in the drawing is shown as accommodating movements of the pointer in both directions from a zero mark representative of equal pressure in the two Bourdon tubes (whereby departures clockwise from zero indicate excess of $P_2$ over $P_1$ and departures counterclockwise an excess of $P_1$ over $P_2$), other suitable markings may be provided, as for example might be appropriate where one of the pressures is always expected to be larger than the other. While the relationships as to parallel relation of the lines of travel and as to perpendicularity to the flexures of the line through the central flexure 42 are not precisely exact for all positions of the yoke or cross-link 30, it is found that in practice the accuracy is very high for a relatively large range in any given instrument. Hence the device provides a desirably sensitive differential pressure gauge, appropriate for a variety of uses where it is necessary to measure or register differences of gas or liquid pressures. Such differential pressure measurements are required in a variety of industries, including those relating to the manufacture of aircraft and missiles, for instance as in the determination of various differential pressures or pressure losses or drops in engine systems. Indeed the accuracy of the present device permits its replacing manometers in many cases.

As explained above, the instrument is useful as a highly sensitive gauge for absolute pressure, for instance by evacuating one of the Bourdon tubes, such as the tube 11, and sealing its inlet closed, e.g. the inlet 16. Under such circumstances pressure $P_1$ is zero and the pressure to be measured is supplied as $P_2$, through the tube 21. The readings of the pointer 66 will then represent measurements of absolute pressure automatically compensating for variations in atmospheric pressure.

It may be noted that in the example shown the Bourdon tubes are arranged in an overlapping relation, with the arcuate figure of each in effect partially surrounding the free movable end of the other. This is a compact arrangement, yet affording very good accuracy in the desired movement of the displacement transmitting means (push rod 40) upon differential displacement of the free tube ends. As explained, such movement occurs substantially only in proportional response to the changes of pressure difference which displace one tube end differentially relative to the other.

It is to be understood that the invention is not limited to the specific structures herein shown and described, but may be embodied in other forms without departure from its spirit.

I claim:

1. In a differential pressure instrument, in combination, a pair of Bourdon tubes, each having a free movable end and disposed relative to each other so that their free ends are movable along spaced, substantially parallel paths, said disposition of the tubes being such that their free ends move respectively in opposite directions when the pressure in both tubes increases relative to the pressure outside them and when the pressure in both tubes decreases relative to the pressure outside them, linking means extending crosswise of the paths and pivotally connected at its ends respectively to the free ends of the tubes for linking said ends of the tubes, said linking means including two flexures respectively connected to the free ends of the tube and to the ends of the linking means and constituting the aforesaid pivotal connection of the linking means to the tube ends, each of the tubes being arranged so that the path of movement of its free end is a substantially straight line, and each of the flexures comprising a spring strip lying in the substantially straight line path of the tube end to which such flexure is connected, and means comprising a movable element connected to the linking means at a locality intermediate said ends of the linking means for displacement by said linking means upon displacement of one of said tube ends differentially relative to the other, to move said element only in accordance with the change of the pressure in the interior of one tube relative to the pressure in the interior of the other tube.

2. In a differential pressure instrument, in combination, a pair of Bourdon tubes each secured at one end and each having a free end moving in an approximately straight line path through distance substantially proportional to changes in pressure between the interior and exterior of the tube, said tubes being disposed with the paths of movement of their free ends substantially parallel and spaced apart, and with the free ends of the tubes movable in respectively opposite directions when the pressure in both tubes increases relative to the pressure outside them and when the pressure outside them, a yoke extending between the free ends of the tubes and pivotally connected at its ends respectively to the free ends of the tubes, and displacement-transmitting means pivotally connected to the yoke at a locality of the yoke intermediate the said ends of the yoke, and arranged to move along a path substantially parallel to the paths of movement of the said tube ends, said displacement-transmitting means being positioned relative to the yoke for displacement of said means along its said path by the yoke only when the pressure in the interior of one tube changes relative to the pressure in the interior of the other tube.

3. An instrument as defined in claim 2, which includes two flexures respectively connected to the free ends of the tubes and to the ends of the yoke and constituting the aforesaid pivotal connection of the yoke to the tube ends, and a flexure connected between the displacement-transmitting means and the yoke at said locality, and constituting the aforesaid pivotal connection of said means to the yoke.

4. In a differential pressure instrument, in combination, a pair of Bourdon tubes, each having a free movable end and disposed relative to each other so that their free ends are movable along spaced, predetermined paths, said disposition of the tubes being such that their free ends move respectively in opposite directions when the pressure in both tubes increases relative to the pressure outside them and when the pressure in both tubes decreases relative to the pressure outside them, a yoke linking the ends of the tubes and displaceable by them, said yoke having flexures respectively connecting it to the tube ends at opposite end localities of the yoke, a movable element, and means connecting said element to the yoke at a locality of the yoke intermediate said end localities for displacement of the element along a predetermined path by the yoke only in proportional response to change of the pressure in the interior of one tube relative to the pressure in the interior of the other tube, said tubes, yoke, flexures and connecting means being cooperatively arranged so that the yoke is moved by the tube ends only in relation to and without displacement of the element, when the pressure in the interior of both tubes relative to the pressure outside them changes in identical manner and amount.

5. In a differential pressure instrument, in combination, a pair of Bourdon tubes, each having a free movable end, and disposed relative to each other so that their free ends are movable along spaced, substantially parallel paths, said disposition of the tubes being such that their free ends move respectively in opposite directions when the pressure in both tubes increases relative to the pressure outside them and when the pressure in both tubes decreases relative to the pressure outside them, a yoke extending between and having flexures respectively connecting it to the said free ends of the tubes, an element movable along a path substantially parallel to the first-mentioned paths and having a flexure connecting said element to said yoke at a locality of said yoke intermediate said flexures, for displacement of the element by the yoke in proportional response to change of the pressure in the interior of one tube relative to the pressure in the interior of the other tube, said flexures and flexure being all disposed in crossing relation to a common straight line extending crosswise of the second-mentioned path, and the said locality of connection of the flexure to the yoke being selected for angular movement only of the yoke about said flexure when the pressure in the interior of both tubes relative to the pressure outside them changes in identical manner and amount.

6. An instrument as defined in claim 5, wherein the movable element comprises a push rod, and which comprises indicating means including an actuating member having a flexure pivoting the member for angular displacement, said member having a lever arm, and a flexure connecting the push rod to the lever arm, for swinging the actuating member in accordance with displacements of the rod.

7. In a differential pressure instrument, in combination, a pair of Bourdon tubes each secured at one end and each having a free end movable in an approximately straight line path through a distance substantially proportional to changes in pressure between the interior and exterior of the tube, said tubes being disposed with the paths of movement of their free ends substantially parallel and spaced apart, and with the free ends of the tubes movable in respectively opposite directions along said parallel paths when the pressure in both tubes decreases relative to the pressure outside them and when the pressure in both tubes decreases relative to the pressure outside them, the tubes having curved, arcuate figures disposed in the same plane and the tubes being disposed with the arcuate figure of each extending around the free end of the other, a yoke extending between and having flexures respectively connecting it to the said free ends of the tubes, a push rod, and connecting means comprising a flexure connecting one end of the push rod to the yoke at a locality intermediate said tube ends, for displacement of the rod by the yoke along a path substantially parallel to the paths of movement of the said tube ends, said connecting means being positioned on the yoke for displacement of the rod only in proportional response to change of the pressure in the interior of one tube relative to the pressure in the interior of the other tube.

8. An instrument as defined in claim 7, wherein the flexures and flexure are all disposed in crossing relation to a common straight line extending crosswise of the path of movement of the push rod, and wherein the connecting means includes means for adjusting its position on the yoke, to dispose it for the aforesaid proportional response of the push rod to differential displacement of the tube ends while permitting the yoke to swing about the rod-connecting flexure when the pressure in the interior of both tubes relative to the pressure outside them changes in identical manner and amount.

9. An instrument as defined in claim 8, which includes a scale, and means including a pointer movable relative to the scale and actuated by the push rod, for indicating the difference of pressures in the tubes.

References Cited in the file of this patent

UNITED STATES PATENTS

| 2,403,256 | Beck | July 2, 1946 |
| 2,667,886 | Brewster | Feb. 2, 1954 |
| 2,850,901 | Proctor | Sept. 9, 1958 |

FOREIGN PATENTS

| 593,954 | France | Sept. 4, 1925 |

UNITED STATES PATENT OFFICE
CERTIFICATE OF CORRECTION

Patent No. 3,095,745                                  July 2, 1963

John O. Kirwan

It is hereby certified that error appears in the above numbered patent requiring correction and that the said Letters Patent should read as corrected below.

Column 10, lines 16 and 17, for "decreases" read -- increases --.

Signed and sealed this 31st day of March 1964.

(SEAL)
Attest:
ERNEST W. SWIDER

Attesting Officer

EDWARD J. BRENNER

Commissioner of Patents